Figure 1:
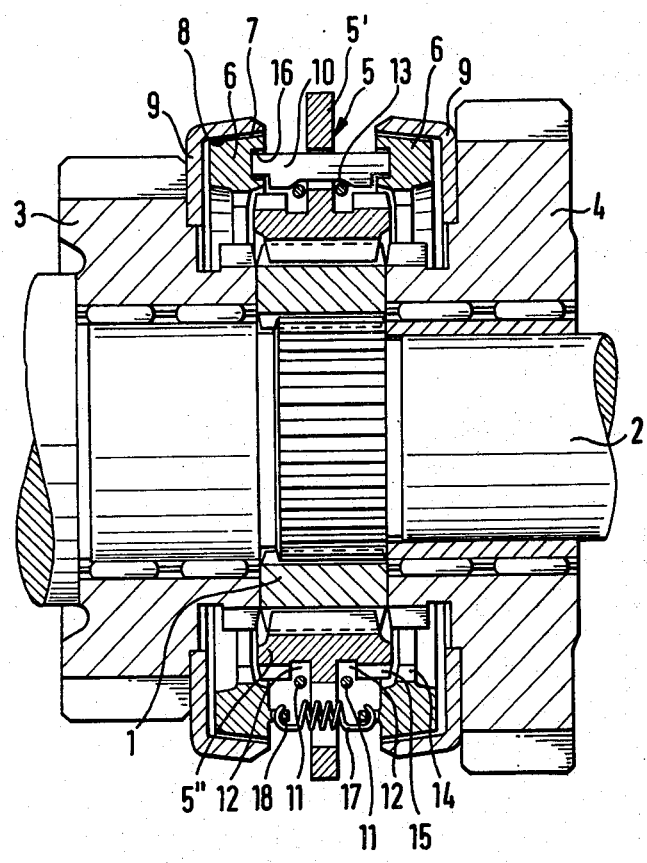

United States Patent [19]

Kuzma

[11] 4,271,943
[45] Jun. 9, 1981

[54] BLOCKING SYNCHRONIZATION DEVICE FOR GEAR-TYPE CHANGE-SPEED TRANSMISSIONS

[75] Inventor: Gyözö Kuzma, Dachau, Fed. Rep. of Germany

[73] Assignee: Bayerische Motoren Werke A.G., Munich, Fed. Rep. of Germany

[21] Appl. No.: 964,457

[22] Filed: Nov. 29, 1978

[30] Foreign Application Priority Data

Dec. 7, 1977 [DE] Fed. Rep. of Germany ....... 2754382

[51] Int. Cl.³ .......................................... F16D 23/08
[52] U.S. Cl. ............................... 192/53 F; 192/87.17
[58] Field of Search ................. 192/53 F, 53 E, 87.17

[56] References Cited

U.S. PATENT DOCUMENTS

| 2,633,954 | 4/1953 | Allen | 192/53 E |
| 2,992,714 | 7/1961 | Peras | 192/53 F |
| 2,993,579 | 7/1961 | Altmann | 192/53 F X |
| 3,749,215 | 7/1973 | Rommelshausen | 192/53 F |
| 3,795,293 | 3/1974 | Worner | 192/53 F |
| 4,059,178 | 11/1977 | Magg et al. | 192/53 F |
| 4,125,179 | 11/1978 | Cochran et al. | 192/53 F X |

FOREIGN PATENT DOCUMENTS

| 872438 | 4/1953 | Fed. Rep. of Germany . | |
| 1049168 | 1/1959 | Fed. Rep. of Germany | 192/53 F |
| 1094051 | 12/1960 | Fed. Rep. of Germany . | |
| 1550672 | 12/1972 | Fed. Rep. of Germany . | |
| 2420206 | 11/1975 | Fed. Rep. of Germany . | |
| 1906863 | 5/1976 | Fed. Rep. of Germany . | |
| 749210 | 5/1956 | United Kingdom | 192/53 F |
| 1029847 | 5/1966 | United Kingdom . | |

OTHER PUBLICATIONS

"Automobile Review", *Engineering*, Nov. 22, 1963, pp. 650-651.
Installation Instruction ZF-Synchromesh 4-Speed Gearbox S4-60, 7/17/1979.

*Primary Examiner*—C. J. Husar
*Assistant Examiner*—Moshe I. Cohen
*Attorney, Agent, or Firm*—Craig and Antonelli

[57] ABSTRACT

A blocking synchronization for gear-type change-speed transmissions with a sleeve carrier, on which a shifting sleeve is non-rotatably but displaceably arranged for connection with a gear to be engaged, as well as with two friction rings arranged on both sides of the shifting sleeve and provided with externally conical friction surfaces which are held at a mutual spacing by way of spacer bolts extending through the shifting sleeve and are centered thereby; the blocking device further includes inwardly directed blocking elements at the friction rings as also blocking elements on the outside of the shifting sleeve body, whereby the blocking elements are toothed arrangements while the spacer bolts engage in axial recesses of the friction rings and the friction rings are axially stressed against the spacer bolts by drawsprings.

2 Claims, 2 Drawing Figures

BLOCKING SYNCHRONIZATION DEVICE FOR GEAR-TYPE CHANGE-SPEED TRANSMISSIONS

The present invention relates to a blocking synchronization device for gear-type change-speed transmissions, essentially consisting of a sleeve carrier, on which a shifting sleeve is non-rotatably and displaceably arranged for the connection with a gear to be engaged, additionally of two friction rings arranged on both sides of the shifting sleeve and provided with outer conical friction surfaces, which are retained at a mutual spacing by way of spacer bolts extending through the shifting sleeve and are centered thereby and which are additionally held in a center starting position relative to the shifting sleeve by way of elastically yielding means, whereby a blocking mechanism is provided which includes inwardly directed blocking elements at the friction rings as also blocking elements at the outside of the shifting sleeve body.

In a prior art blocking synchronization device of this type (compare German Pat. No. 872,438), the inwardly directed blocking elements provided at the friction rings are relatively large blocking rollers which cooperate with grooves that are milled into the outside of the shifting sleeve body. As a result of the size of the blocking rollers, a relatively large displacement path of the shifting sleeve is necessary up to the complete engagement of these rollers in the grooves, which requires a relatively large structural space, conditions a large weight of the blocking synchronization device and finally leads to an altogether large shifting path or travel.

Additionally, in the prior art type of construction, the spacer bolts are rigidly connected with the two friction rings, for example, by peening over or by riveting, from which results, on the one hand, a high assembly expenditure and, on the other, the disassembly of the individual parts of the blocking synchronization device is rendered considerably more difficult.

The present invention is concerned with the task to provide a blocking synchronization device for gear-type change-speed transmissions of the aforementioned type which with slight structural space is simple in manufacture and assembly, requires a short shifting path coupled with high shifting performance and has a long working life.

The underlying problems are solved with a blocking synchronization mechanism of the above-mentioned type of construction in that the blocking elements of the friction rings and of the shifting sleeve body are each blocking tooth arrangements, and in that additionally the spacer bolts engage in axial recesses of the friction rings, whereby the friction rings are axially stressed and held against the spacer bolts by drawsprings. The blocking tooth arrangements at the inner side of the friction rings enable a better force distribution over the entire circumference which again has as a consequence a lesser wear of the blocking surfaces of these teeth. The blocking tooth arrangement necessitates a considerably smaller space requirement than, for example, the aforementioned blocking rollers, which additionally makes possible a comparatively shorter shifting travel. By reason of the fact that the blocking tooth arrangements of the friction rings are directed radially inwardly, one has a considerably more free hand with the enlargement of the effective diameter of the friction cone so that the synchronizing performance can be increased. With an increased synchronizing output, the required shifting force is smaller, while additionally with an enlarged effective friction cone, the thermal loadability of the friction pairing increases and the wear is reduced.

Since the spacer bolts are simply inserted loosely into the recesses of the friction rings and the friction rings are urged or stressed axially against these spacer bolts, the structural parts of the blocking synchronization mechanism can be assembled in a simple manner and can also be readily disassembled—for example, for the purpose of service or replacement of a part. The friction rings which are always stressed or urged toward one another, are relatively insensitive against torsional vibrations which may stem from the engine but which may also come from a non-uniformly rotating cardan shaft, because also the non-engaged friction ring is fixed to a certain degree—even if elastically—by the stressing or clamping action by means of the springs.

Though it is already known from the German Offenlegungsschrift No. 24 20 206 to construct the blocking elements of the friction rings and of the shifting sleeve body each as blocking tooth arrangements, and though it is also known additionally from the German Auslegeschrift No. 1,906,863 to urge two friction rings axially against one another by means of drawsprings, both cases involve synchronization devices of a different type involving considerably greater expenditures.

Accordingly, it is an object of the present invention to provide a blocking synchronization device for gear-type change-speed transmissions which avoids by simple means the aforementioned shortcomings and drawbacks encountered in the prior art.

Another object of the present invention resides in a blocking synchronization mechanism for gear-type change-speed transmissions, which reduces both the structural space required therefor as well as the weight thereof.

A further object of the present invention resides in a blocking synchronization mechanism for gear-type change-speed transmissions of the type described above which not only allows a considerable reduction in costs for manufacture, but also greatly facilitates assembly as well as disassembly thereof.

Still a further object of the present invention resides in a blocking synchronization for gear-type change-speed transmissions which provides a short shifting path coupled with high shifting performance.

Still another object of the present invention resides in a blocking synchronization mechanism of the type described above which excels by long life expectancy of its parts.

Another object of the present invention resides in a blocking synchronization device for gear-type change-speed transmissions, which is characterized by relatively low wear, slight space requirements and increased synchronization output.

A further object of the present invention resides in a blocking synchronization device for gear-type change-speed transmissions which is relatively insensitive to vibrations.

Figure 2:
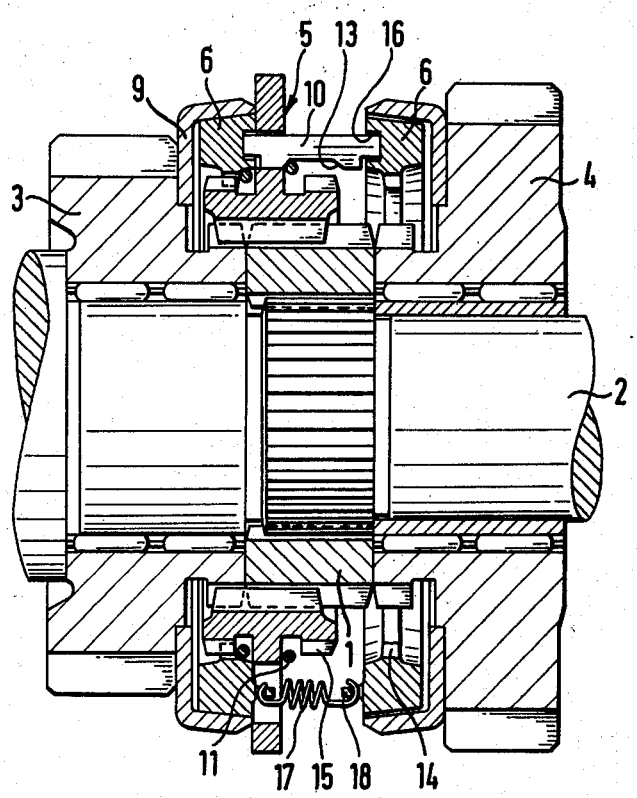

These and other objects, features and advantages of the present invention will become more apparent from the following description when taken in connection with the accompanying drawing which shows, for purposes of illustration only, one embodiment in accordance with the present invention, and wherein:

FIG. 1 is an axial cross-sectional view through one embodiment of the blocking synchronization device in accordance with the present invention, and illustrating the normal disengaged condition of the shifting sleeve; and FIG. 2 is an axial cross-sectional view, similar to FIG. 1, and illustrating the position of the shifting sleeve when a gear is engaged.

Referring now to the drawing wherein like reference numerals are used throughout the two views to designate like parts, in the blocking synchronization illustrated in FIGS. 1 and 2, reference numeral 1 designates the sleeve carrier which is rigidly connected with the transmission shaft 2 for rotation in unison therewith. A shifting sleeve generally designated by reference numeral 5 is, in turn, non-rotatably but displaceably arranged on the shifting sleeve carrier 1 for connection with a gear 3 or 4 to be engaged. Furthermore, friction rings 6 are provided on both sides of the shifting sleeve 5. The rings 6 have external conical friction surfaces 7. Corresponding internal conical or cone-shaped friction surfaces 8 of sheet-metal rings 9 are coordinated to the friction surfaces 7, whereby the sheet-metal rings 9 are rigidly connected with the gears 3 and 4, respectively.

The friction rings 6 are held at a mutual spacing by way of spacer bolts 10 and are centered thereby. The spacer bolts 10 extend through an outwardly directed center web 5' of the shifting sleeve 5. In the center starting position according to FIG. 1, the two friction cone rings 6 are held relative to the shifting sleeve 5 by two spring rings 11 which, on the one hand, engage with sections of their circumference (not shown) in two outer circumferential grooves 12 of the shifting sleeve body 5" and which, on the other, abut at two inwardly directed inclined abutment surfaces 13 of the spacer bolts 10.

Blocking tooth arrangements 14 and 15 are provided as blocking elements at the friction rings 6 and at the shifting sleeve body 5", respectively, which prevent a shifting-through of the shifting sleeve 5 into the shifting teeth of a gear; the blocking teeth of the blocking tooth arrangements 14 and 15 are bevelled off at the mutually facing end-face areas in a known manner. The teeth of the blocking tooth arrangement 14 of the friction rings 6 are arranged at the inner side of the friction rings 6 and point radially inwardly, whereas the teeth of the blocking tooth arrangement 15 of the shifting sleeve body 5" are directed outwardly.

As can be seen from the drawing, the spacer bolts 10 engage in axial recesses 16 provided in the mutually facing end-faces of the friction rings. The friction rings 6 are axially stressed against the spacer bolts 10 by drawsprings 17. The spacer bolts 10 and drawsprings 17 are each arranged angularly uniformly displaced to one another. Hooks are provided at the ends of the drawsprings 17, which engage in eyelets 18 of the friction rings 6 that project axially from the end faces thereof.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A blocking synchronization device for gear-type change-speed transmissions, comprising sleeve carrier means, shifting sleeve means non-rotatably but displaceably arranged on the sleeve carrier means for the connection with a gear to be engaged, two friction ring means having outer conical friction surfaces and arranged on both sides of the shifting sleeve means, spacer bolt means extending through the shifting sleeve means for holding the friction ring means at a mutual spacing and for centering the same, elastically yielding means for holding said friction ring means in a central starting position relative to the shifting sleeve means, and blocking means including inwardly directed blocking elements at the friction ring means as also blocking elements on the outside of the shifting sleeve means, characterized in that the blocking elements of the friction ring means and of the shifting sleeve means are toothed means, in that spacer bolt means engage in axial recesses of the friction ring means and in that the friction ring means are stressed axially against the spacer bolt means by drawsprings.

2. A blocking synchronization device according to claim 1, characterized in that the elastically yielding means include two spring rings which, on the one hand, engage with sections of their circumference in two outer circumferential grooves of the shifting sleeve means and, on the other hand, abut at two inwardly directed inclined abutment surfaces of the spacer bolt means.

* * * * *